Nov. 21, 1944. W. F. DREW 2,363,120
OVEN
Filed June 8, 1942 2 Sheets-Sheet 1

INVENTOR
William F. Drew

Nov. 21, 1944. W. F. DREW 2,363,120
OVEN
Filed June 8, 1942 2 Sheets-Sheet 2
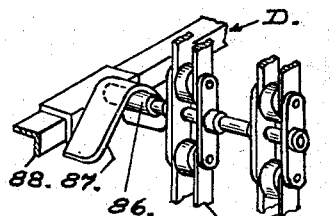
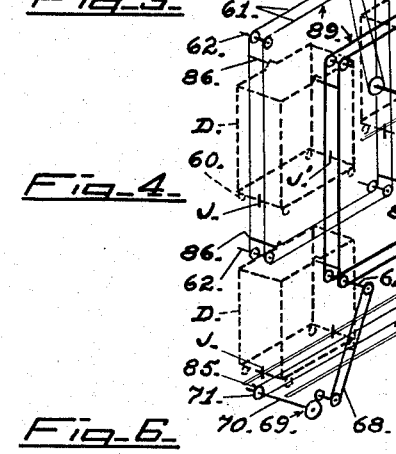
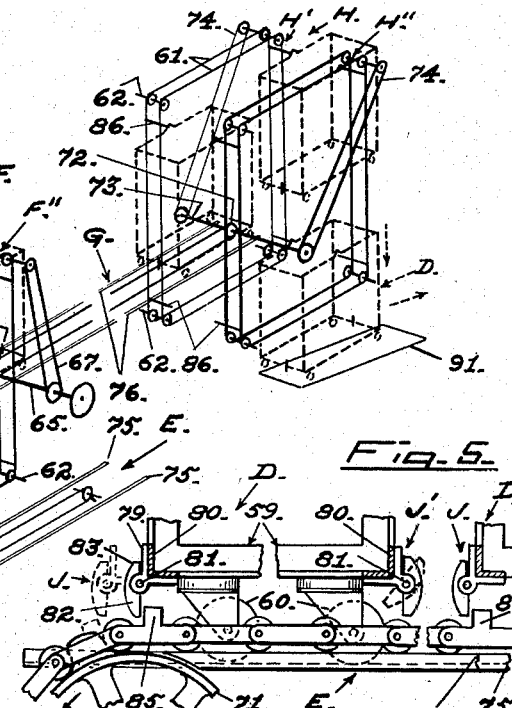
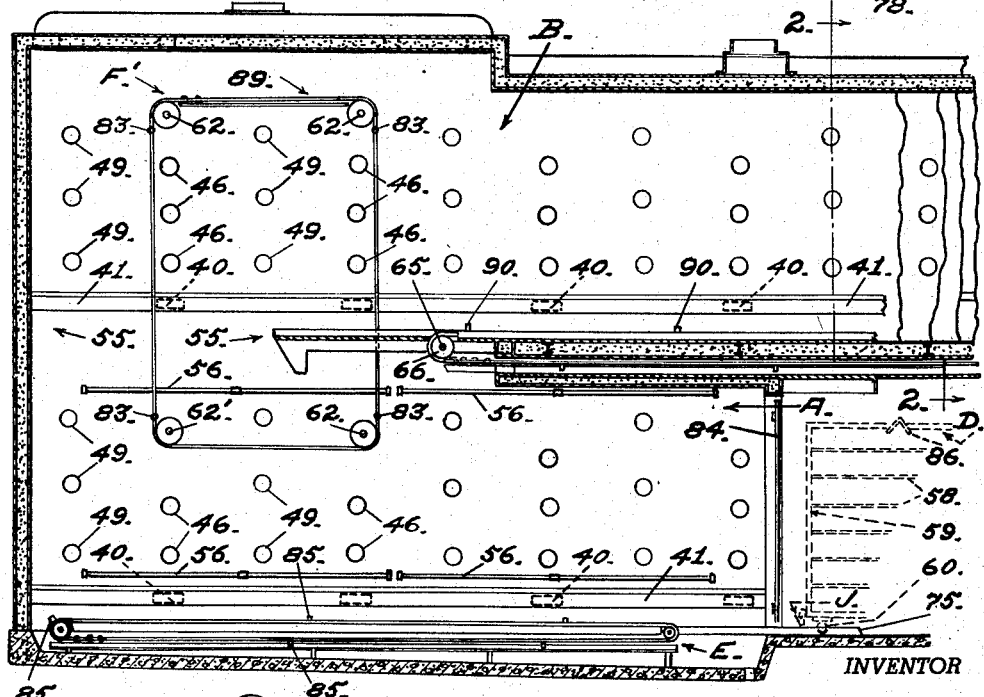
INVENTOR
William F. Drew Patented Nov. 21, 1944

2,363,120

UNITED STATES PATENT OFFICE 2,363,120

OVEN

William F. Drew, Los Angeles, Calif.

Application June 8, 1942, Serial No. 446,260

12 Claims. (Cl. 107—57)

This invention relates to improvements in ovens of the continuous type wherein the goods to be baked are continuously fed into and removed therefrom.

Ovens conserving this purpose in general consist of types characterized as tray, hearth or belt travelers. Such ovens in usual practice are embodied as a floor level device having one or more charging or discharge doors. The bottoms of such doors are from three to four feet above the floor and the opening a foot or more high, and the overall oven height in the largest types does not exceed twelve feet. It is therefore apparent that at least one-third, and in many cases one-half, of the baking chamber volume is subject to a thermal equilibrium disturbance each time the door or doors are open, and the doors of several types of such ovens are continuously open during operation.

It is a well known detriment to the production of a consistently uniform quality of goods; that an open doorway when related to the baking chamber as described provides the cause, the effect of which is to generate two distinct air flow currents in the oven; cold air flowing over the door sill into the baking chamber and the exit therefrom, through the upper area of the doorway, of the heated gases.

In the production of bakery goods, steam is an adjunct of the baking process and when, as in usual practice, it is applied directly to the baking chamber the efficiency of both the steaming and the baking process are affected as the function of the one tends to destroy the other; steaming, to be efficient, is a moistening process whereas baking is effected by a drying action. Furthermore, the balancing of desired proportional functions of these counteractive elements in the one chamber is difficult of consistent attainment and the persistent recurrence of an out of balance condition results in a too-wet or too-dry oven, as every baker knows and is kept on the jump to rectify.

An object of my invention is to provide an oven wherein the heated fluid volume of the baking chamber is, by the novel method of introducing and discharging goods, rendered immune to the occurrence of cold and hot air exchange-flow currents, and wherein a fully banked or trapped and therefor equalized heat application is attainable from the top down to the extreme lower level occupied by the goods in the baking chamber.

Another object of the invention is to provide a chamber wherein a drying, moistening or other proofing or processing action is so related to the baking chamber as to apply and vent such fluid contents as are used in successive steps of the process in a manner substantially separate from the baking chamber.

A further object is to provide an oven baking chamber wherein the arrangement of elements formative thereof and constituting means whereby; complemental air for combustion at the heat source, and the application of the heating fluid to and the venting thereof from the baking chamber, are effected in a manner eliminating the detrimental effects of all room drafts and all air entrainment or escapement except as and where required.

A further object is to provide an oven wherein and at any desired zone extent along the length thereof admission and venting of the heating fluid is controllable to effect a live heat flow through the baking chamber or a banked heat therein from the top down to any desired, or the lowermost level, occupied by the goods to be baked.

A further object is to provide an oven whereby proofing racks for bakery goods as well as loading or other racks utilized in the processing of articles preparatory for the baking process are cause to serve as conveyance means for the goods prior to, during and after baking and in consequence; eliminate oven-loading piece-by-piece handling of the goods.

Another object is to provide an oven wherein the combined use of rack units as providing conveyance means for both the conditioning and baking process simplifies the oven structure and reduces the cost of baking equipment as the racks serve a double purpose.

With the above and other objects in view the invention consists in the novel construction and combination of parts hereinatfer described, illustrated in the accompanying drawings, and set forth in the claims hereto appended, it being understood that various changes in form, proportion, size and minor details of construction within the scope of the claims may be resorted to without departing from the spirit or sacrificing any of the advantages of the invention.

In the drawings:

Figure 3 is a fragmentary perspective view showing the conveyor and rack parts adapted to engage each other for the purpose of raising or lowering the rack with respect to the baking chamber.

Figure 4 is a diagrammatic perspective view of the ensemble conveyor means.

Figure 5 is a fragmentary elevational view of the lowermost and horizontal unit of the conveyor system.

Figure 6 is a longitudinal center-line section of the left end of the oven as portrayed in Figure 1.

Figure 7 is a detail sectional view of the apertured pipes forming a part of the oven structure as shown in Figure 6.

Figures 1, 2:
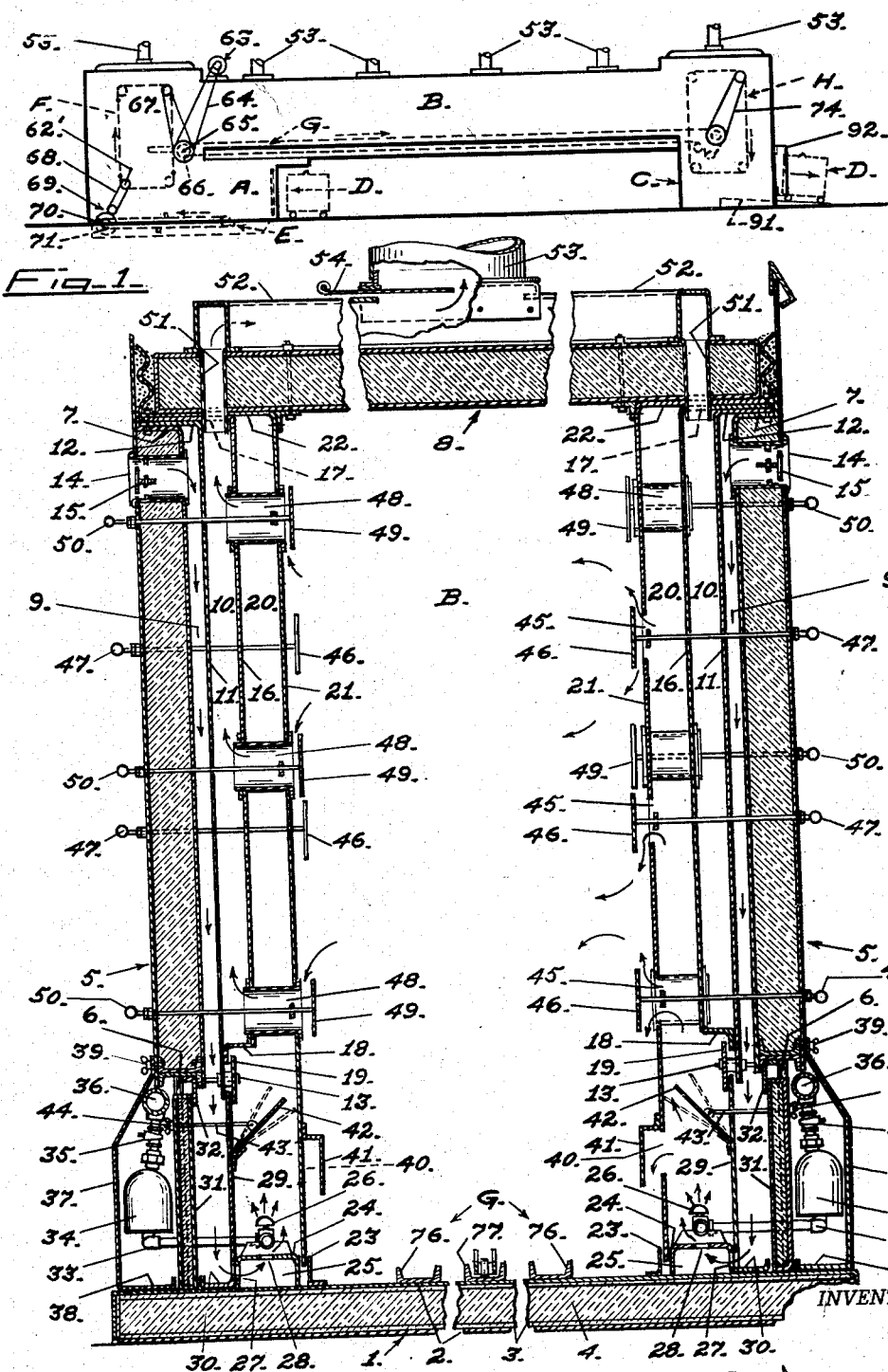
Figure 1 is a schematic side elevational view of the oven of my invention.
Figure 2 is an enlarged cross sectional view of the oven as taken on line 2—2 of Figure 6.

As shown in the accompanying drawings one form of the oven of this invention generally comprises a processing chamber A, a baking chamber B and an elevator or discharge chamber C.

As indicated by the arrows designating the cycle of operation, the goods to be processed are primarily subjected to treatment in the chamber A, followed by the baking process in chamber B, and discharge through the chamber C. However, by simple modifications of the conveyor system it will serve to run in the other direction thereby reversing the process whereby the goods are first elevated in chamber C, baked in chamber B and subject of a complemental process in chamber A. Further, for the purpose of designating the continuity of the device the description defines the parts and related whole as conserving the processing of bakery goods, but it is understood that the oven of this invention, in purpose and use is not confined thereto.

As shown in Figure 1 the oven comprises the chamber A, the chamber C in spaced relation thereto and the chamber B disposed above, between and connecting the chambers A and C. This arrangement of chambers A, B and C disposes the baking chamber B above the inlet opening of chamber A, also above the outlet opening of chamber C whereby the thermal equilibrium of the oven is not disturbed nor the operations thereof impaired as a result of the frequent opening and closing of the doors for said openings during a baking operation. Moreover, this arrangement affords the additional advantages of more effectively separating the processing or steaming chamber A from the baking chamber B; rendering the floor space below the baking chamber available for use, and facilitating the loading of the oven. No steam introduction directly into the baking chamber or throughout said chamber as heretofore practised is necessary with the present arrangement and therefore the steaming and baking functions are carried out more effectively without interfering one with the other as would be the case if such functions were carried out in the same chamber.

As shown in Figure 6, the disposition of parts forming the chamber A are counterparts of the chamber B and a description of the one will serve for the other.

Referring to Figure 2, the chamber B is formed of top, bottom and side members each of the side members composed of an insulating wall and curtain walls forming flues disposed side by side within, and substantially the full length of each insulating wall and having means connecting the respective flues with the oven chamber.

In detail; the bottom 1 of the chamber B consists of metal sheets 2 maintained in spaced relation by structural shapes 3 the space thus formed being packed with insulating material 4. Formed in like manner, the insulating side walls 5 are supported in spaced relation to the bottom 1 by the columns 6, the upper edge 7 of the walls 5 serving to support the superimposed upper ends of the metal sheet material providing the several flues above defined, as well as support the insulated top 8 formed as described for the bottom 1.

By the novel means shown I provide highly preheated supplemental air for combustion and baking requirements and efficiently utilize therefor the heat otherwise lost in the gases vented from the baking chamber as well as that otherwise radiated through the exterior walls, which by this novelty of arrangement are thinner than otherwise required. These qualities are attained by forming the supplemental air inlet flues 9 next to, from top to bottom, and the full length of, the exterior walls 5 and the baking chamber vent flues 10 of similar extent.

The flues 9 are formed by the sheet metal curtain walls 11 having their upper ends flanged at 12 to rest on the walls 5 and hang in spaced relation thereo, their lower ends secured to the walls 5 by the stud bolts 13. At longitudinally spaced intervals near the top of the walls 5 the thimbles 14 having the dampers 15, provide for regulatable inlet of the air for combustion, the velocity and diffusion of which is effected by the rightangular flow caused to result from deflection by the curtain walls 11 and entrainment downward into the bottom of the heating flues by the consistently steady oven venting draft force. It is thus seen that room draft disturbances are efficiently dampened in effect and a consistently uniform complemental air entrainment-flow provided.

The vent flues 10 are formed next to, from top to bottom, and substantially the full length of the flues 9, by the sheet metal curtain walls 16 in spaced relation to the walls 11 and having their upper ends flanged at 17 to rest upon the flanges 12 of the walls 11. The lower end of walls 16 are flanged as at 18 to loosely lie between the walls 11 and a keeper bar 19 held in spaced relation on the stud bolts 13.

The heating flues 20 are formed next to, from top to bottom of, and substantially the full length of the baking chamber, by the sheet metal curtain walls 21 having their upper ends flanged at 22 to rest upon the flanges 17 of the walls 16. The lower ends of each of the walls 21 are disposed to loosely lie between the angle bars 23 and the inverted channel members 24 forming tunnels 25 and above which are mounted the heat source burners 26.

To provide easy access to the burners 26 and coincidently extend the flues 9 to connect with the tunnels 25 for the flow of air to the burners through the longitudinally spaced series of holes 27 and 28 in the channels 24; the removable sheet metal panels 29 have their respective upper edges loosely inserted between the sheet 11 and keeper bar 19 with the lower edge flanges 30 resting upon the bottom or floor 1. Continuity of the flue 9 and burner accessibility are further effected by the removable insulated panels 31 adapted to stand on the bottom or floor in spaced relation to the panels 29 by the flanges 30, and with their tops engaging the lintels 32 on the walls 5. The burners 26 are connected by the pipes 33 to suitable fuel regulator and shut-off means 34 and 35 respectively, in turn connect to the fuel headers 36 concealed and protected by the removable housing 37 maintained in spaced relation to the panel 31 and adapted to rest on the bottom or floor 1 by the flange 38 and also be removably secured to the walls 5 by the thumb screws 39.

To provide properly balanced application of heat to the baking chamber from the burners 26; applied as "bottom" or "top" heat in correctly adjustable relative proportions, the longitudinally spaced openings 40, Figures 2 and 6, having the deflecting baffles 41 admit the heating fluid directly to the bottom of the baking chamber the quantity thereof proportional to the setting of the longitudinally extending swinging dampers 42. These dampers, adjusted by means of the rods 43 and wing nuts 44, may be set to deliver all the heat through the openings 40 or cause any portion thereof to flow into the flues 20.

Referring to Figure 2; vertical rows of openings 45 controlled by the dampers 46 mounted on the push-pull rods 47, and vertical rows of thimbles 48 controlled by the dampers 49 mounted on the push-pull rods 50, are disposed opposite each other in the respective walls 21 and communicate the oven chamber to the heat flues 20 and the vent flues 10 as inlets and outlets respectively thereof. Further as shown in Figure 6, the vertical rows of openings 45 with respective dampers 46 and the vertical rows of thimbles 48 with respective dampers 49 are disposed in alternating spaced relation longitudinally in each chamber wall 21. Moreover, as the vertical rows of openings 45 and vertical rows of thimbles 48 are transversely opposite but alternating in each wall 21, it is seen that heat from the flues 20, can be influenced (more or less by adjustment of the respective dampers) to flow across the chamber in alternating transverse directions. In other words, vertically disposed zones of heat alternate in flowing from side to side of the chamber to equalize the application of "live" heat. In distinct contrast the application of "banked" heat of any desired intensity, defined as horizontal layers of heat constituting a volume applicable as to extent from the top to the lowermost portion of the chamber, is attained by respective setting of horizontal rows of the heat admission and venting dampers 46 and 49 respectively. Furthermore, by means of combinations of damper adjustments above defined in a baking chamber of the length characterized (from sixty to eighty feet or more) longitudinally positioned zones of either live or banked heat are provided for to conserve the requirements of heat application responsive to the required treatment of the goods being baked. For example, bread at the beginning of the baking process requires quiescent, diminishingly moist heat, and at the end of the bake a constantly withdrawn live heat to add color, whereas crackers require exactly reversed treatment, rapid withdrawal of live heat to begin and a diminishingly moist banked heat at the "end" of the bake to prevent brittleness of the cracker.

Referring to Figure 2, the thimbles 48 extend through the walls 21 across the heat flues 20 and terminate in the walls 11 thus communicating the baking chamber to the vent flues 10 in turn communicated by the thimbles 51 to the breechings 52 and individual, spaced vent connections 53 provided with the dampers 54.

Referring to Figure 6, the opening 55 into bottom of chamber B communicating with the chamber A, and a like opening (not shown) in chamber C, form the sole means of ingress and egress (other than the heating and venting means above described) to the baking chamber. By this means the lighter, tending to rise, heated fluid conserving the baking process is trapped in the baking chamber to the bottom level thereof and is in consequence unaffected by the entrance and exit of goods thereinto in contradistinction to ovens wherein the charging doors (located as above described) define means for the escape of heated gases and the inflow of a cooling counterpart of room-temperature or "cold" air.

To provide for treatment of the goods to be baked, for example the steaming of bread in chamber A as a preliminary step in the process of baking; the pipes 56, Figures 6 and 7, having the openings 57 are supported in any suitable manner on the walls 21 and connected to a steam source not shown.

As a means for conveying the goods to be processed through the oven and thereby provide; in lieu of the expensive and intricate conventional tray or belt conveyor systems, a more simple conveyor chain system as shown; and by the same means eliminate the necessity for piece-by-piece handling of the goods in charging the oven, I employ the proofing racks used in usual bakery practice for treatment and handling of the goods prior to baking. Each rack D, Figures 1, 4 and 6, consists of a tier of spaced shelves 58 mounted in a frame 59 supported for movement on the caster wheels 60, the goods to be baked being disposed on the shelves 58.

As a means for moving the racks through the oven I provide the chain conveyor system, Figures 1 and 4, consisting of the conveyor units E, F, G and H, driven and synchronized to continuously move the racks into the chamber A; up into and through chamber B, and down and out of chamber C, the conveyor units being connected and driven by suitable means such as chain belts.

As shown in Figure 4, the "elevator" units F and H, alike in design, consist of the transversely spaced pairs of elements F', F'' and H'—H'' respectively. Each of these elements in turn include spaced pairs of sprocket chains 61, Figure 3, disposed to run over sprocket wheels on the shafts 62 suitably supported within and on respective sides of the oven structure.

To drive and synchronize movement of the conveyor units and elements; power from a suitable source as the prime mover 63, Figure 1, is connected by the chain drive 64 to the cross shaft 65, Figure 4, and therefrom to the conveyor G by means of the chain sprocket 66 and to each of the conveyor elements F' and F'' by the respective chain belts 67. From one of the sprocket shafts 62, designated 62', the chain drive 68 imparts reversed directional movement to the conveyor unit E, relative to conveyor G, by means of the gear train 69 on the shaft 70 on which is mounted the head sprocket 71 of the conveyor unit E.

To impart movement and synchronized control of the conveyor elements H' and H'' in chamber C, Figure 1, the sprocket 72 of the conveyor unit G is mounted on the cross shaft 73, Figure 4, in turn connected to the respective conveyor elements H' and H'' by means of the chain drives 74.

To support and guide the movement of the racks D within the chambers A and B; spaced channel members 75 and 76 respectively, Figures 2 and 6, provide tracks for accommodation of the caster wheels 60 of the racks D, and the channel members 77 and 78, Figures 2 and 5, afford like support and guidance for the respective horizontal runs of the conveyor units G and E.

To provide means whereby the racks D are automatically connected to, moved by and disconnected from the conveyor units E and G; the automatic, end for end operable, and like, drag latches J and J', Figure 5, are mounted on the frame 59. These latches consist of the mountings 79 secured to the transversely central portion of the lower cross members 80 of the frame 59. Pintle pins 81 in the mountings 79 support the pendulous latch member 82 having the one-way-swing stop lugs 83 which permit free inward, but limited outward movement of the latches with respect to the rack frame as shown by the dotted line position in Figure 5.

As illustrated in Figures 1 and 6, the loaded racks D in successive order are, manually or otherwise, brought into position with their caster wheels 60 engaging the tracks 75 of the chamber A and moved thereonto past the swing doors 84 of the inlet opening of the chamber. Thereafter, automatic consecutive movement through chamber A is effected by the conveyor E provided with the spaced drag lugs 85, Figure 5. As it is desirable to move the racks as a trailing load the drag lugs 85 engage the "forward" latches J of the racks. The one-way-swing members 82 provide for lag inaccuracy in timing periods for introducing the racks D into the chamber A; inasmuch as these latches will swing and pass over the drag lugs 85 in whatever travel position they occupy previous to the position of requisite synchronized engagement with and subsequent movement of the racks. The racks D, as continuously and consecutively moved to the inner end of the chamber A are in turn positively released from the conveyor E as the lugs 85 thereof passing around the drive sprocket 71 move arcuately down and out of engagement with the latches J as shown in dotted lines in Figure 5. Relatively simultaneously-timed therewith; lifter bars 86, Figure 3, disposed in equally spaced relation on each of the conveyor elements F' and F'' engage the inverted V shaped yokes 87 affixed to the upper longitudinal members 88 of the racks D. Whereupon, the racks are vertically raised through the opening 55 into the chamber B, thence on the horizontal runs 89, Figures 4 and 6, of the respective conveyors F' and F'' to the "ends" thereof and downward, by means of the vertical conveyor runs, to engagement of the caster wheels 60 with the respective rails 76 of the chamber B. Thereupon spaced drag lugs 90, Figure 6, of conveyor G, similar to those of conveyor E, engage the "forward" latch J' of respective racks D and moves them in continuous order to the end of chamber B; whereat, they are positively positioned and released from the conveyor G in the manner above described for conveyor E.

As the conveyor units F and H, as illustrated are identical in construction the detailed description of the one (F) above described will serve for the other. However, the order of the functions of the latter are in reverse order to those of the former. Whereas the former first raises the racks D into, along and down onto the conveyor G in the chamber B; the latter first raises the racks from conveyor G, then moves them along into, downward in, and released at the bottom of chamber C, Figure 1, to rest upon the inclined track 91 and roll, by gravity, past the out-swinging doors of the outlet opening 92 onto the floor level to which the bottom of the chamber C is designed to reach.

I claim:

1. In an oven; a baking chamber formed of top, bottom and side members including an insulating shell, each of said side members composed of curtain walls forming heating, venting and air supply flues disposed side by side within and substantially the full length of said insulating shell, and means selectively operable for effecting and controlling communication of said flues with said baking chamber.

2. In an oven; a baking chamber formed of top, bottom and side members including an insulating shell, each of said side members composed of curtain walls forming heating, venting and air supply flues disposed side by side within and substantially the full length of said insulating shell, and means selectively operable for effecting and controlling communication of said heating and venting flues with said baking chamber at different levels between the top and bottom of said chamber.

3. In an oven; a baking chamber formed of top, bottom and side members including an insulating shell, each of said side members composed of curtain walls forming heating, venting and air supply flues disposed side by side within and substantially the full length of said insulating shell, and means selectively operable for effecting and controlling communication of said heating and venting flues with said baking chamber at locations throughout the length of said baking chamber.

4. In an oven; a baking chamber formed of top, bottom and side members including an insulating shell, each of said side members composed of curtain walls forming heating, venting and air supply flues disposed side by side within and substantially the full length of said insulating shell, and means selectively operable for effecting and controlling communication of said heating and venting flues with said baking chamber at different levels between the top and bottom thereof and at locations throughout the length of said chamber.

5. In an oven; a chamber formed by top, bottom and side members including an insulating shell, each of said side members composed of at least two curtain walls forming passageways juxtaposed within said insulating shell, and means in said walls for opening and closing communication of said passageways with said chamber.

6. In an oven; a baking chamber formed by top, bottom and side members, each of said side members composed of at least two curtain walls forming a heating chamber and a venting chamber, and selectively operable means for opening and closing communication of said heating and venting chambers with said baking chamber at different zones throughout the baking chamber area of said side members.

7. In an oven; a baking chamber formed by top, bottom and side members, each of said side members composed of at least two curtain walls forming a heating chamber and a venting chamber; and selectively operable means for opening and closing communication of said heating and venting chambers with said baking chamber at different zones throughout the baking chamber, including venting conduits leading through the heating chambers and communicating the baking chamber with the venting chambers, dampers for controlling said conduits, outlets for said heating chambers opening into said baking chamber adjacent said conduits; and dampers for controlling said outlets.

8. In an oven, a baking chamber formed of top, bottom and side members including an insulating shell, each of said side walls having formed therein an air supply flue next adjacent said shell, a venting flue next adjacent the air supply flue, and a heating flue between the venting flue and said baking chamber and in communication with said air supply flue, and means selectively operable at spaced points throughout the exterior surface of the sides of the oven for establishing and controlling communication of said venting and heating flues with said baking chamber at points throughout the side walls areas of said baking chamber.

9. In an oven; a primary chamber substantially horizontally disposed above a secondary substantially horizontal chamber, an opening in the bottom of the one extremity of said primary chamber connected to an opening in the top of one extremity of said secondary chamber provided with a side opening in the other extremity thereof, a vertical chamber in open spatialized relation to said secondary chamber, an upper and a lower opening in said vertical chamber, said primary chamber extending between said secondary and vertical chambers and connected to said upper opening in said vertical chamber and means for conveying goods through said chambers.

10. In an oven; a horizontal chamber and a vertical chamber in open-space relation, an opening in an end and in the top of said horizontal chamber, an upper and lower opening in said vertical chamber, a second horizontal chamber disposed above said first named horizontal chamber, the extremities of said second horizontal chamber connected to said top and upper opening respectively and means for conveying goods through said openings and said chambers.

11. In an oven; a horizontal chamber and a vertical chamber in open-space relation, an inlet opening in an end extremity and an outlet opening in the top of the other extremity of said horizontal chamber, an inlet opening above an outlet opening in opposed sides of said vertical chamber, a second horizontal chamber disposed above said first named horizontal chamber the bottom of one extremity thereof connected to said outlet opening in the top of said first named horizontal chamber, the other extremity of said second horizontal chamber connected to said inlet opening of said vertical chamber and means for conveying goods through said openings and said chambers.

12. In an oven; a horizontal chamber and a vertical chamber in spaced relation, an opening in an end and in the top of opposite extremities of said horizontal chamber, an upper and a lower opening in opposed sides of said vertical chamber, a second horizontal chamber disposed above and connected to said top opening in said first named horizontal chamber and extending therefrom, to and connected to said upper opening in said vertical chamber to provide open space beneath said second horizontal chamber, and means for conveying goods through said chambers.

WILLIAM F. DREW.